June 14, 1932.  T. BRADY  1,863,183
LUBRICATING MECHANISM
Filed March 27, 1930  3 Sheets-Sheet 1

Thomas Brady INVENTOR
BY Walter E. Bradley ATTORNEY

Patented June 14, 1932

1,863,183

UNITED STATES PATENT OFFICE

THOMAS BRADY, OF EAST ORANGE, NEW JERSEY, ASSIGNOR TO OTIS ELEVATOR COMPANY, OF NEW YORK, N. Y., A CORPORATION OF NEW JERSEY

LUBRICATING MECHANISM

Application filed March 27, 1930. Serial No. 439,328.

This invention relates to lubricating mechanism and particularly to lubricating mechanism for the guide rails of elevator installations.

It is desirable in elevator installations to reduce the friction arising from movement of the guide shoes carried by the elevator car or counterweight along the guide rails in the hatchway. Such friction may be reduced by applying a lubricant to the guide rails. It is also desirable that the amount of lubricant applied to the guide rails be regulated in order to avoid excessive lubrication of the rails and waste of the lubricant.

A feature of the present invention is the provision of lubricating mechanism which is automatically operated to supply lubricant to the various guide rails in desired amounts and without waste and which is operated only when the elevator car is in operation.

A second feature resides in transferring lubricant from a supply chamber to a reservoir in equal amounts during operation of the car and controlling the rate of flow of the lubricant from the reservoir to the guide rails.

A third feature resides in the provision of a rotatable bucket wheel for effecting the transfer of the lubricant from the supply chamber to the reservoir for subsequent application to the guide rails.

A fourth feature is the provision of a combined bucket wheel and ratchet actuator therefor.

Other features and advantages will become apparent from the specification, taken in connection with the accompanying drawings wherein one embodiment of the invention is illustrated.

The invention will be described as utilized for applying lubricant to the rails provided for guiding an elevator car in its hatchway. A pair of lubricating devices, one for each guide rail, are carried by the elevator car. According to the embodiments illustrated, each lubricating device comprises a covered lubricant containing casing mounted on the cap of one of the upper guides shoes provided for the car. A combined bucket wheel and ratchet wheel is rotatably mounted in the casing. The bucket wheel is provided with a plurality of pockets for picking up a portion of the lubricant in the casing. A stop mounted on the guide rail in the path of movement of the car is adapted to be engaged by a ratchet operating lever upon each operation of the car to or past the point at which the stop is mounted. Each engagement of the ratchet operating lever with the stop causes the ratchet wheel to be turned causing movement of the bucket wheel to raise a unitary amount of lubricant from the supply in the casing to a point from which it flows into a trough-shaped wiper associated with the bucket wheel and thence into a conduit connected to the casing. The conduit is also connected to the corresponding guide shoe for directing the lubricant to the guide shoe and rail from the lubricating device. The flow of lubricant from the pockets of the bucket wheel to the guide shoe through the conduit is controlled in such manner that all of the fluid raised from the supply in the casing and discharged into the wiper is not immediately applied to the guide shoe and rail but flows slowly to the guide shoe after the operation of the automatic lubricating mechanism.

Figure 1:
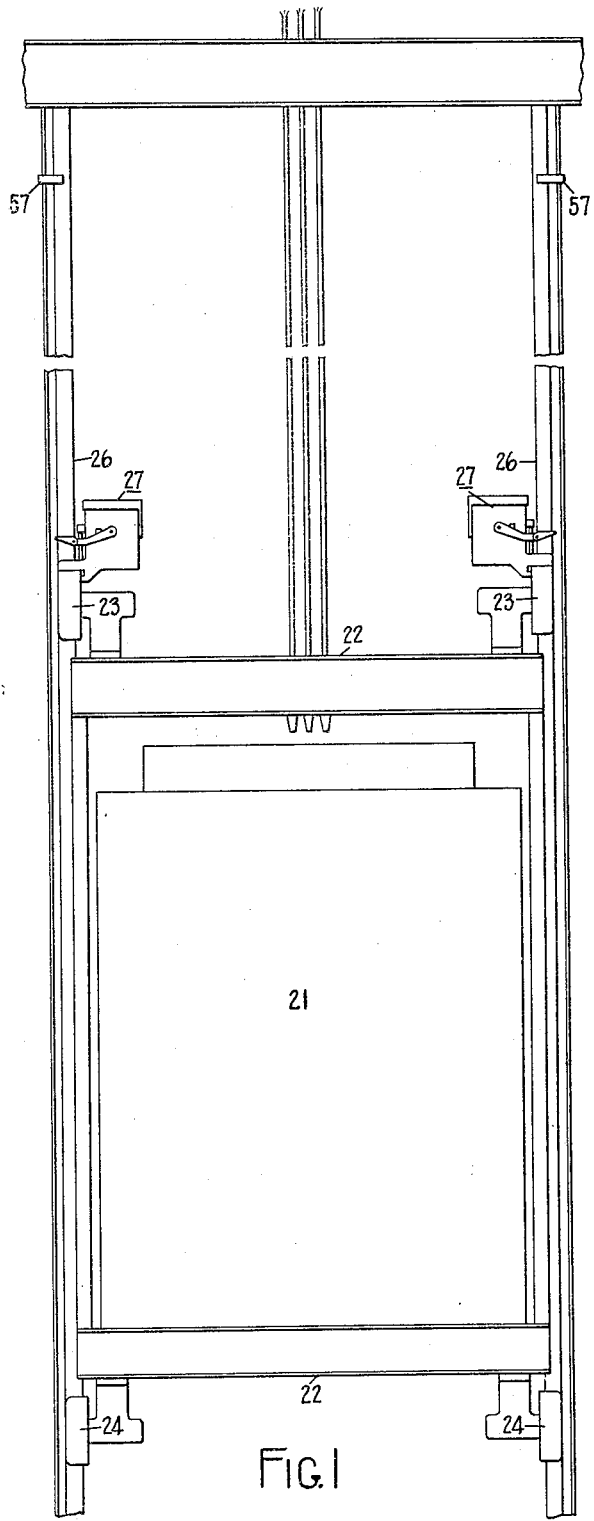
Figure 1 is a schematic view of an elevator installation showing the lubricating mechanism mounted on the elevator car for lubricating the car guide rails.
Figure 5:
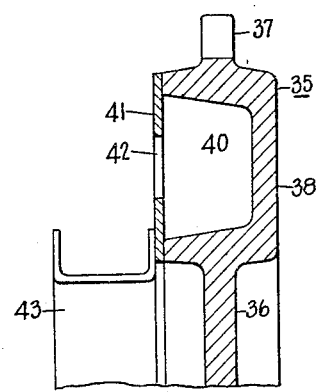
Figure 5 is a sectional view taken along the line 5—5 of Figure 4.
Figure 4:
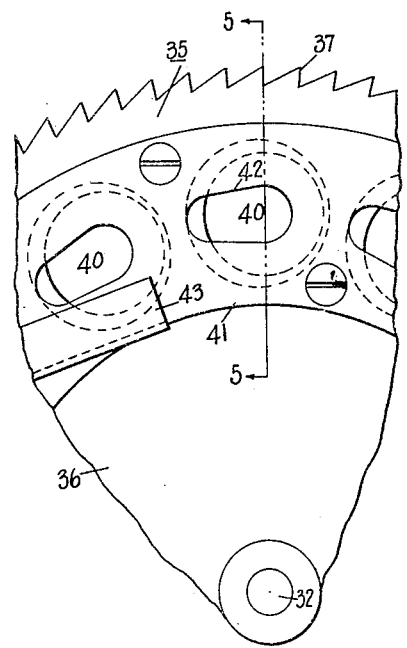
Figure 4 is an enlarged view of a portion of Figure 2.
Figure 3:
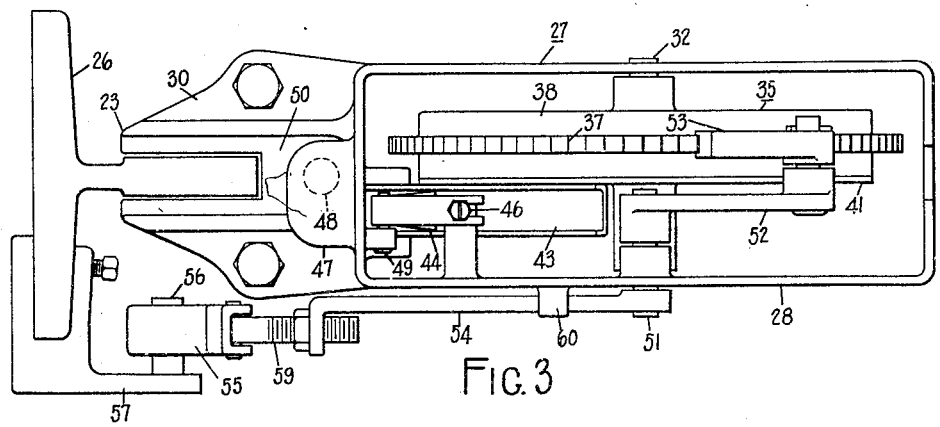
Figure 3 is a plan view of the lubricating mechanism with the cover removed.
Figure 2:
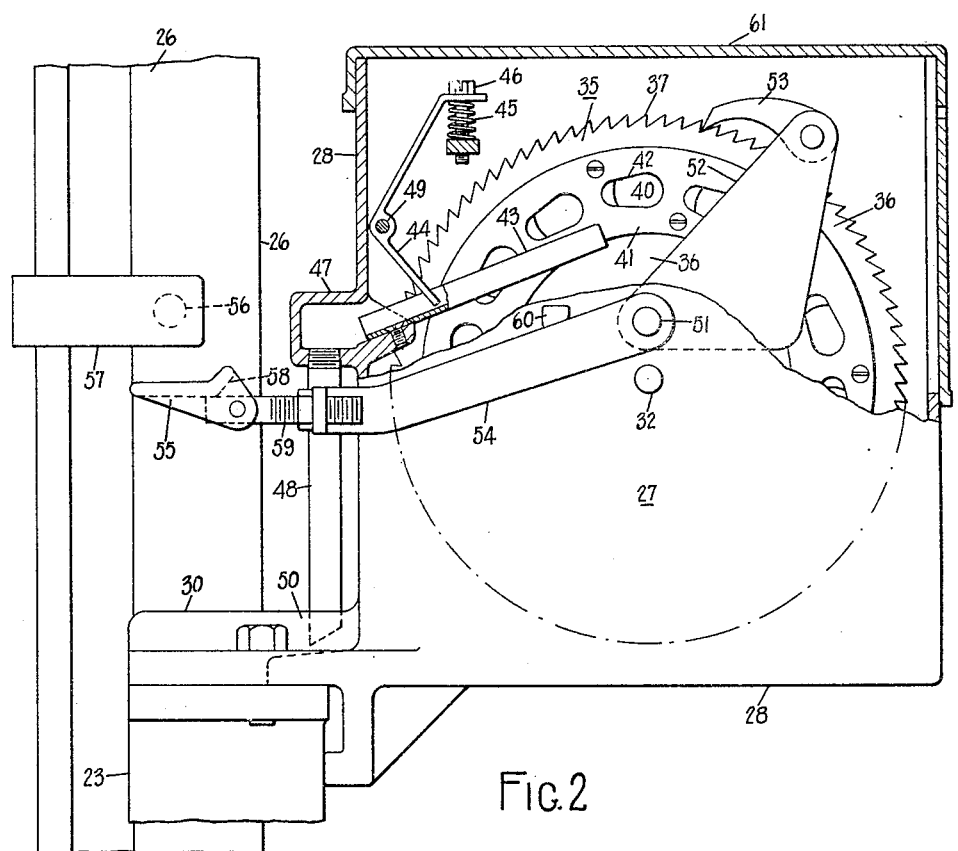
Figure 2 is an enlarged view of one of the lubricating mechanisms illustrated in Figure 1, the lubricator casing being broken away and parts shown in section to illustrate details of construction.

Referring to Figure 1, the numeral 21 designates an elevator car supported by a car sling 22 to which hoisting roping is attached for raising and lowering the car in the hatchway. Guide shoes 23 and 24 are mounted on the car sling for cooperation with guide rails 26 to guide the car in its movement in the hatchway. In order that the friction arising from contact of the guide shoes with the guide rails when the car is in motion may be minimized a lubricant is applied to the guide shoes, and thence to the guide rails, by lubricating mechanisms, designated as a whole by 27, associated with the guide shoes 23. Inasmuch as each of the lubricating mechanisms is of identical construction only a single mechanism will be described in detail.

Referring also to Figures 2, 3, 4 and 5, a fluid tight casing 28 is mounted on the cap 30 of guide shoe 23. A non-rotatable stub-shaft 32 mounted in the side walls of the casing supports a bucket wheel assembly, designated as a whole by 35, for rotation thereon. Bucket wheel assembly 35 comprises a ratchet wheel 36 mounted on shaft 32 and having ratchet teeth 37 on its peripheral surface. The annular portion 38 of the wheel is provided with a plurality of circumferentially arranged pockets 40. An annular plate 41 is secured to the wheel and is provided with a plurality of openings 42. Each of the openings 42 is alined with one of the pockets 40 and its area is made less than that of the corresponding pocket opening for a purpose which will become apparent as the description proceeds.

A trough-shaped wiper 43 is mounted in the casing so that one edge of the trough is in wiping contact with the annular plate 41. A vane 44 is pivoted on a rod 49 mounted in the walls of the casing. The contour of the lower end of vane 44 conforms to the trough of wiper 43. A spring 45, carried by a stud 46, is mounted between a lug on the wall of casing 28 and vane 44 for biasing the lower end of the vane into the trough of wiper 43. Stud 46 passes freely through an opening in vane 44 and is threaded into the lug to afford an adjusting means for regulating the clearance between the lower end of vane 44 and the base of the trough of wiper 43. One end of wiper 43 extends into a projection 47 of the casing. A conduit 48 is threaded at its upper end into projection 47 and extends into a pocket 50 formed in guide shoe cap 30. Pocket 50 extends forwardly from conduit 48 and is open at its forward end to afford communication between conduit 48 and the guiding surfaces of the guide shoe.

A shaft 51 rotatably mounted in one wall of the casing has a weighted arm 52 fixed thereto within the casing. A pawl 53 is pivotally mounted on arm 52 for cooperation with the teeth 37 of ratchet wheel 36. A ratchet operating lever 54 is fixed to shaft 51 exteriorly of casing 28 and extends toward the guide rail 26. Weighted arm 52 biases pawl 53 and lever 54 to the positions illustrated in Figure 2, a limit stop 60 being provided for the lever. Lever 54 is provided with a pivoted trip 55 for cooperation with a stop 56 mounted on a clamp 57 secured to the base of guide rail 26, preferably near the top of the hatchway. Lever 54 is provided with an adjustable end portion 59 for regulating the amount of overlap between trip 55 and stop 56. Trip 55 is mounted on lever 54 in such manner as to effect depression of the lever only when trip 55 is moved into engagement with stop 56 as the car is moved upwardly in the hatchway. The end 58 of trip 55 is adapted to engage lever 54 to prevent movement of the trip in the opposite direction beyond a position from which it may gravitate back to the position illustrated in Figure 2. A cover 61 is provided for casing 28 to exclude dirt or other objects from the interior of the casing.

The operation is as follows: After the installation of the lubricating device a lubricating fluid such as light or heavy oil, is introduced into casing 28, filling the latter to a point immediately below the openings provided in the walls of the casing for shaft 32. The oil flows through the openings 42 in plate 41 to fill pockets 40 which lie below the oil level. Ratchet operating lever 54 is then operated manually for retracting pawl 53 and advancing the latter into engagement with ratchet teeth 37 to turn bucket wheel 35. It will be assumed for the purpose of the present description that each operation of the ratchet causes the bucket wheel to turn an amount corresponding to the distance between the center lines of adjacent pockets. The manual operation of lever 54 is continued for raising oil containing pockets above the oil level until all the pockets positioned to the right of the center line of the bucket wheel, and above the fluid level, contain oil. As bucket wheel 35 is turned a portion of the oil in these pockets flows back to the casing through opening 42. However, as the openings 42 in annular plate 41 are smaller than the pocket openings with which they are alined a quantity of oil is retained in each pocket. The lubricating device is now ready for effecting automatic lubrication of the guide rail.

It has previously been stated that clamp 57 is mounted on guide rail 26 near the top of the hatchway. Clamp 57 is positioned so that, as the elevator car nears the upper terminal, trip 55 of the lubricating device carried by the car is moved into engagement with stop 56 causing depression of ratchet operating lever 54 to turn shaft 51. As shaft 51 is turned arm 52 moves therewith and pawl 53 engages a ratchet tooth 37 to effect rotary movement of bucket wheel assembly 35. One of the fluid containing pockets 40 is thus moved over the center line of the bucket wheel. As a result, a portion, or all, of the oil carried in this pocket flows therefrom through opening 42 over plate 41 and into the trough of wiper 43. The rate of flow of the oil from pocket 40 to wiper 43 varies in accordance with the viscosity of the oil. The trough of wiper 43 serves as a reservoir for the oil deposited therein by the pockets 40. The oil flows along wiper 43 into conduit 48 at a rate determined by the adjustment of vane 44 to regulate the flow of oil by varying the clearance between the end of the vane and the base of the trough of wiper 43. The oil passes through conduit 48 into pocket 50 in guide shoe cap 30 and onto the guiding surfaces of the guide shoe 23 for lubricating the latter and also the guide rail 26. When the car is moved into alinement with the upper terminal, trip 55 moves from engagement with and beyond stop 56 on guide rail 26. Weighted arm 52 then acts to retract pawl 53 over ratchet teeth 37 and returns lever 54 and trip 55 to the positions illustrated in Figure 2 in preparation for a subsequent automatic lubricating operation. When, as the elevator car is lowered in the hatchway, trip 55 on ratchet operating lever 54 engages stop 56, the trip pivots upwardly about the lever to avoid damage to the lubricating mechanism on the car and without effecting its operation.

Each trip of the elevator car to the upper terminal results in automatic operation of the lubricating device to discharge a unitary quantity of oil from a pocket of bucket wheel 35 into the trough of wiper 43. The quantity of oil in the various pockets positioned above the oil level at the right of the center line of the bucket wheel may differ because of the variation, at each position, of the effective area of openings 42 through which fluid may flow from the pocket back to the casing. However, the quantity of oil discharged is the same in each operation inasmuch as the oil contained in any pocket 40 when it is moved over the center line of the bucket is the same as that previously contained by the preceding pocket and the amount of oil which may flow through opening 42 to the wiper is determined by the effective area of opening 42, which is the same for all pockets when positioned at the discharge point.

Figure 6:
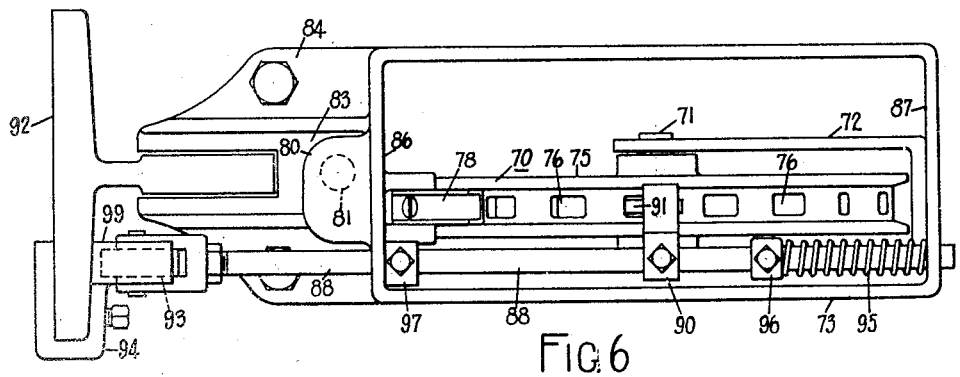
Figure 6 is a plan view of a modified construction of the lubricating mechanism, the cover being removed.
Figure 7:
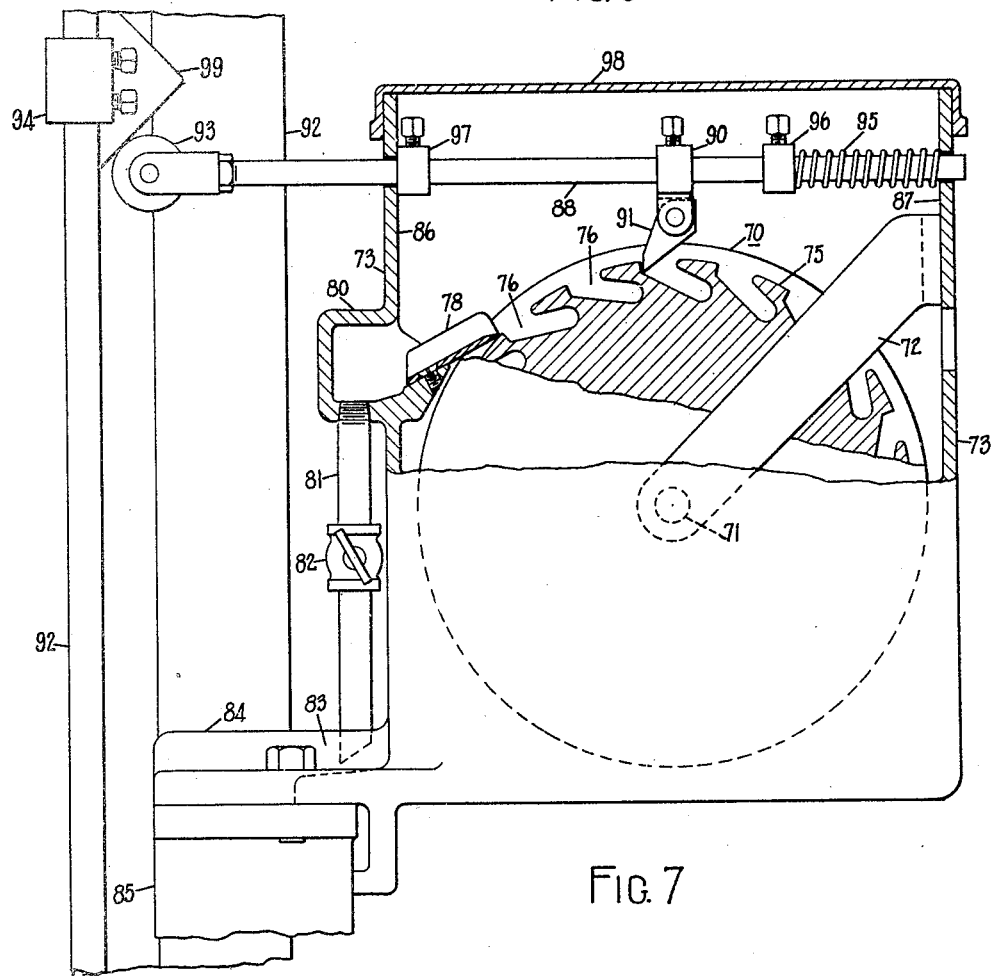
Figure 7 is a side view of the arrangement shown in Figure 6 with part of the casing broken away and some parts shown in section.

In the arrangement shown in Figures 6 and 7 bucket wheel assembly 70 is rotatable on a stud 71 carried between the tines of a fork 72 secured to the end wall of casing 73. The bucket wheel 70 comprises a cylindrical body portion 75 provided with a plurality of circumferentially arranged pockets 76, the open ends of the pockets being located in the peripheral surface of the body portion. A trough-shaped wiper 78 has one end positioned in wiping contact with the peripheral surface of the body member. The other end of wiper 78 extends into a projection 80 of casing 73. A chamber in projection 80 together with the portion of a conduit 81 between projection 80 and a valve 82 controlling the conduit constitutes a reservoir chamber. Conduit 81 is connected at one end to projection 80 and its other end extends into a pocket 83 in the cap 84 of a guide shoe 85 on which the lubricating device is mounted, as in the arrangement previously described.

A rod 88 is guided in the end walls 86 and 87 of casing 73. A collar 90 is secured on rod 88. A pawl 91 pivoted on collar 90 overlies the bucket wheel 70 and is arranged to cooperate with one edge of the openings of the peripherally disposed pockets 76 to rotate the bucket wheel. Rod 88 extends from casing 73 toward the back of guide rail 92 and is provided with a roller 93 for engaging a cam 99, carried by a clamp 94, as the car moves in the hatchway. Clamp 94 is mounted on the back of guide rail 92 preferably near the top of the hatchway. A spring 95 mounted between wall 87 and a collar 96 on rod 88 biases the roller 93 toward the cam 99 and is also adapted to cause pawl 91, when retracted, to rotate the bucket wheel. A square collar 97 on rod 88 is provided for preventing rotary movement of rod 88 and for engaging wall 86 to limit the movement of rod 88 by spring 95. When a lubricating fluid is introduced into casing 73, the fluid level lies immediately below the outer end of wiper 78. A cover 98 is provided for the casing.

In operation the roller 93 engages cam 99 on clamp 94 as the car is moved to the upper terminal. Engagement of roller 93 with cam 99 results in movement of rod 88 against the force of spring 95 to retract pawl 91 from engagement with the edge of the pocket 76 which the pawl overlies into the next pocket in a clockwise direction. When the elevator car is moved away from the upper terminal roller 93 moves from engagement with cam 99. Spring 95 acts to project roller 93 and move pawl 91 into engagement with the forward edge of the pocket 76, thus turning bucket wheel 70 an amount equal to the distance between the center lines of adjacent buckets. All or a portion of the oil contained in the pocket 76 to the left of the center line of the bucket wheel then flows therefrom into wiper 78 and the reservoir, as the following pocket is moved over the center line. The quantity of oil discharged from the pockets into the wiper is the same for each step by step operation of the bucket wheel, as the quantity flowing from any pocket to the wiper is determined by the oil level for the pocket at the discharge point. The fluid flows from the reservoir past valve 82 for lubricating the guide shoe and the guide rail. Thus, a unitary quantity of oil is transferred from the supply in casing 73 to wiper 78 and the reservoir upon each operation of the lubricating device and the rate of flow of oil from the reservoir to the guide shoe and guide rail is regulatable by adjustment of valve 82.

It is to be noted that, in either the arrangement shown in Figures 1 to 5 or that of Figures 6 and 7, each step by step operation of the bucket wheel results in movement thereof to raise an oil containing pocket from the oil supply and to move another oil containing pocket into position to discharge a part or all of its contents into the trough of the wiper. In either case, the amount flowing from the pockets is the same for successive operation of the bucket wheel, as previously described. The unit quantity thus discharged flows from the wiper after the operation of the bucket wheel to lubricate the guide rails. Inasmuch as the bucket wheel is rotated step by step only when the car is in operation, there is no waste of lubricant and the guide rails do not become coated with an excessive amount of lubricant as might occur if the lubricating devices applied oil to the guide rails continuously whether the car was in operation or out of service.

If the car is out of service for an extended period, as over a week-end, it may happen that when the car is restored to service the quantity of oil on the guide rail is insufficient for the proper lubrication thereof. However, the lubricating devices are arranged to maintain an oil containing pocket positioned to discharge oil for lubricating the guide rail. Consequently, upon operation of the lubricating device in the movement of the car when it is restored to service, oil is immediately discharged into the wiper from which it flows to lubricate the guide rail.

The unit quantity of oil discharged for each trip of the car to one of its operated positions in the hatchway may be varied to conform to the operating conditions in various installations. Although the bucket wheels have been described as being operated in steps equal to the distance between center lines of adjacent pockets, it is to be understood that the bucket wheels may be operated in such manner as to advance the bucket wheels a lesser or greater amount. In the arrangement shown in Figures 1 to 5 this may be effected by regulating the amount of overlap between stop 56 and trip 55 on the ratchet operating arm. If desired, a pawl lifter may be provided for adjustably varying the effective stroke of the pawl. In the arrangement of Figures 6 and 7, it may be desirable to associate a ratchet wheel, similar to the ratchet wheel in Figures 1 to 5, with the buck wheel 76 instead of operating the bucket wheel by a pawl engaging an edge of the bucket openings. Thus in either arrangement, each operation of the bucket wheel results in the discharge of only a portion of the oil capable of discharge from a pocket, the discharge of all the oil capable of discharge from a pocket, or in the discharge of oil from more than a single pocket, as determined by the adjustments to vary the amount of movement of the bucket wheel. In this manner the lubricating devices may be adjusted to meet the lubricating requirements of various elevator installations, each trip of the car to a point at which the lubricating mechanisms are operated causing discharge of at least sufficient oil into the wipers to properly lubricate the guide rails until the next operation of the lubricating mechanisms and the oil being distributed from the wiper to the rails during the trip of the car as a result of the adjustments of vanes 44 or valves 82.

Although the lubricating mechanisms have been described as automatically operated only upon movement of the car to the upper terminal, the lubricating mechanisms may also be operated at the lower terminal. In the arrangement of Figures 1 to 5, the pivoted trip on the ratchet operating arm would yield, to avoid damage to the lubricating mechanism on the car and without effecting its operation, as the car passed the stop at the lower terminal in the downward direction. The terminal floor operating cam or cams for the arrangement of Figures 5 to 7 may be arranged to provide a flat surface extending beyond the high point of the cam to eliminate the possibility of double operation in the event that the car overruns the floor.

The casing of the lubricating mechanisms may, if desired, be mounted at desired points in the hatchway and arranged to apply lubricant directly to the guide rails. In such event the ratchet operating stop would be carried by the car.

It is to be understood that similar lubricating mechanisms may be provided for lubricating the counterweight guides.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an elevator installation; a hatchway; a guide rail in said hatchway; a casing; a supply of fluid lubricant in said casing; a member rotatably mounted in said casing and having pockets adapted to raise unit quantities of said lubricant from said supply;

means for receiving lubricant from said pockets; means for directing said lubricant from said receiving means to said guide rail to lubricate said guide rail; means for causing rotary movement of said rotatable member in steps; and means for adjusting the amount of movement of said rotatable member for controlling the quantity of lubricant received by said receiving means upon each step of operation of said rotatable member.

2. In an elevator installation; a hatchway; a guide rail in said hatchway; a movable body in said hatchway; a guide on said body for cooperating with said guide rail to guide said body in its movement in the hatchway; a casing; a supply of lubricant in said casing; means for receiving said lubricant from said supply; a member rotatably mounted in said casing, said member having a plurality of pockets each of which is adapted to raise lubricant from said supply and deposit a unit quantity thereof into said receiving means; means for directing said lubricant from said receiving means to said guide for lubricating said guide and guide rail; means, operable upon each arrival of said body at a certain point in said hatchway from a certain direction, for causing an operation of said rotatable member of an amount to effect discharge of said lubricant from one or more pockets in said rotatable member; and means for controlling said directing means to regulate the application of said lubricant to said guide from said receiving means.

3. In an elevator installation; a hatchway; a guide rail in said hatchway; a movable body in said hatchway; a guide carried by said body for cooperating with said guide rail to guide said body in its movement in said hatchway; a casing carried by said body; a supply of fluid lubricant in said casing; a rotatable member in said casing, said member having a portion provided with openings which form pockets for raising lubricant from said supply upon rotation of said member; a trough-shaped wiper mounted in said casing for receiving lubricant from said pockets as the pockets are moved over the center lines of said rotatable member on rotation thereof; a conduit connected to said wiper and to said guide for directing lubricant from said wiper to said guide for lubricating said guide and said guide rail; and means, operable upon movement of said body to one of its operated positions in said hatchway, for turning said rotatable member to discharge lubricant from said pockets into the trough of said wiper.

4. In an elevator installation; a hatchway; a guide rail in said hatchway; a movable body in said hatchway; a guide carried by said body for cooperating with said guide rail to guide said body in its movement in said hatchway; a casing carried by said body; a supply of fluid lubricant in said casing; a rotatable member in said casing, said member having a portion provided with openings which form pockets for raising lubricant from said supply upon rotation of said member; a trough-shaped wiper mounted in said casing for receiving lubricant from said pockets as the pockets are moved over the center line of said rotatable member on rotation thereof; a conduit connected to said wiper and to said guide for directing lubricant from said wiper to said guide for lubricating said guide and said guide rail; means, operable upon movement of said body to one of its operated positions in said hatchway, for turning said rotatable member to discharge lubricant from said pockets into the trough of said wiper; and adjustable means for controlling the flow of lubricant from said wiper to said guide.

5. In an elevator installation; a hatchway; a guide rail in said hatchway; a movable body in said hatchway; a guide carried by said body for cooperating with said guide rail to guide said body in its movement in said hatchway; a casing carried by said body; a supply of fluid lubricant in said casing; a rotatable member in said casing, said member having a portion provided with openings which form pockets for raising lubricant from said supply upon rotation of said member; a trough-shaped wiper mounted in said casing for receiving lubricant from said pockets as the pockets are moved over the center line of said rotatable member on rotation thereof; a conduit connected to said wiper and to said guide for directing lubricant from said wiper to said guide for lubricating said guide and said guide rail; a pawl for operating said rotatable member; an operator for said pawl; and a stop positioned on said guide rail to be engaged by said pawl operator for causing rotary movement of said rotatable member to discharge lubricant into the trough of said wiper upon each movement of said body to one of its operated positions in said hatchway.

6. In an elevator installation; a hatchway; a guide rail in said hatchway; a movable body in said hatchway; a guide carried by said body for cooperating with said guide rail to guide said body in its movement in said hatchway; a casing carried by said body; a supply of fluid lubricant in said casing; a rotatable member in said casing, said member having a portion provided with openings which form pockets for raising lubricant from said supply upon rotation of said member; a trough-shaped wiper mounted in said casing for receiving lubricant from said pockets as the pockets are moved over the center line of said rotatable member on rotation thereof; a conduit connected to said wiper and to said guide for directing lubricant from said wiper to said guide for lubricating said guide and said guide rail; means, operable upon movement of said body to one of its operated positions in said hatchway, for turning said rotatable member to discharge lubricant from said pockets into the trough of said wiper; and an adjustable vane cooperating with said wiper for regulating the flow of lubricant from said wiper to said guide.

7. In an elevator installation; a hatchway; a guide rail in said hatchway; a movable body in said hatchway; a guide carried by said body for cooperating with said guide rail to guide said body in its movement in said hatchway; a casing carried by said body; a supply of fluid lubricant in said casing; a rotatable member in said casing, said member having a portion provided with a plurality of openings which form pockets for raising lubricant from said supply upon rotation of said member; a plate secured to said member, said plate having a plurality of openings therein, each of said openings being alined with one of said pockets and its area being less than that of the corresponding pocket opening for retaining lubricant in said pocket as said pocket is moved to the center line of said rotatable member; a trough-shaped wiper mounted in said casing for receiving unit quantities of lubricant from said pockets as they are moved over the center line of said rotatable member, one edge of the trough of said wiper being positioned in wiping contact with said plate; a conduit connected to said guide for directing lubricant from said wiper to said guide for lubricating said guide and said guide rail; and an adjustable vane cooperating with said wiper for regulating the flow of lubricant from said wiper to said conduit.

8. In an elevator installation; a hatchway; a guide rail in said hatchway; a movable body in said hatchway; a guide carried by said body for cooperating with said guide rail to guide said body in its movement in said hatchway; a casing carried by said body; a supply of fluid lubricant in said casing; a rotatable member in said casing, said member having a portion provided with a plurality of openings which form pockets for raising lubricant from said supply upon rotation of said member; a plate secured to said member, said plate having a plurality of openings therein, each of said openings being alined with one of said pockets and its area being less than that of the corresponding pocket opening for retaining lubricant in said pocket as said pocket is moved to the center line of said rotatable member; a trough-shaped wiper mounted in said casing for receiving unit quantities of lubricant from said pockets as they are moved over the center line of said rotatable member, one edge of the trough of said wiper being positioned in wiping contact with said plate; a conduit connected to said wiper and to said guide for directing lubricant from said wiper to said guide for lubricating said guide and said guide rail; an adjustable vane cooperating with said wiper for regulating the flow of lubricant from said wiper to said conduit; and means, operable upon movement of said body to one of its operated positions in said hatchway, for turning said rotatable member to move one of the pockets therein beyond the center line thereof for discharging lubricant into the trough of said wiper.

9. In an elevator installation; a hatchway; a guide rail in said hatchway; a movable body in said hatchway; a guide carried by said body for cooperating with said guide rail to guide said body in its movement in said hatchway; a casing carried by said body; a supply of fluid lubricant in said casing; a rotatable member in said casing, said member having a portion provided with a plurality of openings which form pockets for raising lubricant from said supply upon rotation of said member; a plate secured to said member, said plate having a plurality of openings therein, each of said openings being alined with one of said pockets and its area being less than that of the corresponding pocket opening for retaining a unit quantity of lubricant in said pocket as said pocked is moved to the center line of said rotatable member; a trough-shaped wiper mounted in said casing for receiving said lubricant from said pockets as they are moved over the center line of said rotatable member, one edge of the trough of said wiper being positioned in wiping contact with said plate; a conduit connected to said wiper and to said guide for directing lubricant from said wiper to said guide for lubricating said guide and said guide rail; an adjustable van cooperating with said wiper for regulating the flow of lubricant from said wiper to said conduit; ratchet teeth on said rotatable member; a pawl for cooperating with said ratchet teeth; an operating lever for said pawl; and a stop positioned on said guide rail to be engaged by said lever for operating said pawl to turn said rotatable member for discharging lubricant into said wiper upon each movement of said body to one of its operated positions in said hatchway.

10. In an elevator installation; a hatchway; a guide rail in said hatchway; a movable body in said hatchway; a guide carried by said body for cooperating with said guide rail to guide said body in its movement in said hatchway; a casing carried by said body; a supply of fluid lubricant in said casing; a rotatable member mounted in said casing, said member having an annular portion provided with a plurality of pockets; an annular plate secured to said rotatable member, said annular plate having a plurality of openings each of which is alined with one of said pockets; a trough-shaped wiper mounted on said casing, one edge of said trough-shaped wiper being in wiping contact with said annular member; an adjustable vane extending into said wiper; a conduit in communication with said wiper and with said guide; ratchet teeth on said rotatable member; a pawl for cooperating with said ratchet teeth; an operating lever for said pawl; a trip on said lever; and a stop on said guide adapted to be engaged by said trip for operating said lever to cause said pawl to engage said ratchet teeth to effect rotation of said rotatable member upon movement of said body to one of its operated positions in said hatchway; whereby upon movement of said body to said operated position a unitary quantity of lubricant is raised from said supply by said pockets and deposited therefrom into said wiper to flow from said wiper, at a rate determined by the adjustment of said vane, through said conduit to said guide for lubricating said guide and guide rail.

In testimony whereof, I have signed my name to this specification.

THOMAS BRADY.